United States Patent [19]
Ludwig et al.

[11] 3,865,787
[45] Feb. 11, 1975

[54] RESIN STABILIZER SYSTEMS OF ORGANOTIN SULFUR-CONTAINING COMPOUNDS AND ALKALI METAL BISULFITE ADDITION PRODUCTS

[75] Inventors: Jerome H. Ludwig, Shaker Heights; Dale J. Dieckmann, Euclid, both of Ohio

[73] Assignee: Dart Industries Inc., Los Angeles, Calif.

[22] Filed: Apr. 23, 1973

[21] Appl. No.: 353,911

[52] U.S. Cl. ....... 260/45.75 S, 260/45.7 S, 252/406
[51] Int. Cl. ............................................ C08f 51/62
[58] Field of Search ................ 260/45.7 S, 45.75 S; 252/406

[56] References Cited
UNITED STATES PATENTS

| | | | |
|---|---|---|---|
| 2,235,796 | 3/1941 | Britton et al. | 260/45.7 |
| 3,240,721 | 3/1966 | Fordyce | 260/45.75 |
| 3,542,725 | 11/1970 | Kopacki et al. | 260/45.75 |
| 3,560,431 | 2/1971 | Weedon et al. | 260/45.7 |
| 3,764,571 | 10/1973 | Jennings et al. | 260/45.75 |

Primary Examiner—V. P. Hoke
Attorney, Agent, or Firm—Wood, Herron & Evans

[57] ABSTRACT

A resin stabilizer composition which essentially contains:

a. an organotin sulfur-containing compound, for example, organotin mercaptides, organotin mercapto-acids, organotin mercaptoacid esters, organotin sulfides, organothiostannoic acids and the like, and b. an alkali metal bisulfite addition product, including aldehyde or ketone alkali metal bisulfites, for example, acetone sodium bisulfite, cyclohexanone sodium bisulfite, glyoxal sodium bisulfite, formaldehyde sodium bisulfite, acetaldehyde sodium bisulfite and cyclohexanone potassium bisulfite.

These compositions synergistically contribute to the long term heat stability of vinyl halide resins. Among other advantages, the stabilizing efficiencies of such compositions are excellent and clarity in molded vinyl halide resins can be achieved with these stabilizer compositions.

16 Claims, No Drawings

RESIN STABILIZER SYSTEMS OF ORGANOTIN SULFUR-CONTAINING COMPOUNDS AND ALKALI METAL BISULFITE ADDITION PRODUCTS

BACKGROUND OF THE INVENTION

It is well-known in the art that organotin sulfurcontaining compounds such as the organotin mercaptides are among the most efficient (by weight) heat stabilizers for vinyl halide resins. Many such organotin compounds are even now perhaps widely recognized as the best available single-compound stabilizers for polyvinyl chloride resins. Among the organotin sulfur-containing compounds which have been proposed for the stabilization of polyvinyl chloride resins are organotin mercaptides, organotin mercaptoacids as described in U.S. Pat. Nos. 2,641,588; 2,648,650; 2,726,227; 2,726,254; 2,801,258; 2,870,119; 2,891,922; 2,914,506 and 2,954,363; the organotin mercaptoacid esters as described in U.S. Pat. No. 2,641,596; organotin esters of mercapto alcohols of U.S. Pat. Nos. 2,870,119; 2,870,182; 2,872,468 and 2,883,363; and organo thiostannoic acids such as butyl thiostannoic acid as disclosed in U.S. Pat. Nos. 3,021,302; 3,413,264; 3,424,712 and 3,424,717.

All of these organotin compounds have in common a sulfur-containing radical or atom attached to the tin through the sulfur atom and a hydrocarbon or substituted hydrocarbon group directly attached to the tin through a carbon atom. This combination of radicals has heretofore been recognized as giving optimum stabilization from the standpoint of clarity and heat stability. However, there are certain factors which have limited the use of organotin sulfur-containing compounds. Chief among these factors are their high cost. Also, sulfur-containing radicals introduce an odor problem. Further, these compounds also tend to impart poor light stability and plasticize rigid polyvinyl chloride (PVC) compositions. Therefore, vinyl halide resin formulators have heretofore sought to overcome such deficiencies.

In copending application, Ser. No. 116,671, by Jennings, et al., now U.S. Pat. No. 3,764,571, organotin stabilizer systems are described, particularly suited for the stabilization of vinyl halide resins against degradation by heat. Such stabilizer systems permit resins to be molded and worked under the action of heat into many useful articles. In accordance with that application, a composition comprising an organotin sulfur-containing compound, a metal carboxylate and a metal base remarkably contributes to vinyl halide resin heat stability. This three-component composition also provides for a very efficient utilization of the rather expensive organotin sulfur-containing component. Heat stabilities were achieved with the three-component novel compositions which are unobtainable at the same total levels of the individual components when used alone or in two-component combinations with one another. Also, in copending application Ser. No. 353,910, filed on Apr. 23, 1973, by Jennings, et al., entitled "Resin Stabilizer Systems of Organotin Sulfur-Containing Compounds," alkali bisulfites were exemplified in synergistic heat-stabilizing combinations with an organotin sulfur-containing compound.

SUMMARY OF THE INVENTION

The present invention is directed to further improvements in resin stabilizer systems of organotin sulfur-containing compounds. This invention is predicated in part upon the discovery that organotin sulfur-containing compounds in combination with alkali metal bisulfite addition products can be employed as heat stabilizers for resins. Furthermore, such a stabilizer combination has been found to synergistically extend the long term heat stability of vinyl halide resins. Therefore, from these standpoints, this invention broadens the utility of these components, and, importantly, of the resins containing these materials which can thereby be molded into useful articles.

Equally significant is our further discovery that the mentioned addition products in our stabilizer combination provide a clarity in the molded resin that is otherwise unachievable with inorganic alkali metal bisulfites. For instance, inorganic alkail metal bisulfites as reported above in combination with organotin sulfur-containing compounds unexpectedly extend the long term heat stability of vinyl halide resins. However, a haziness or cloudiness accompanies such heat stabilization upon molding the vinyl halide resins. Such haziness does not detract from the heat stabilization against discoloration but, in certain molding applications, the haziness may not be acceptable. However, addition products of alkali metal bisulfites, such as aldehyde or ketone alkali metal bisulfites, can stabilize the resin against discoloration in combination with the organotin compound without producing haziness or cloudiness in the molded resin. Such results are clearly advantageous. Among other advantages, the aldehyde or ketone alkali metal bisulfites are more efficient stabilizers than the inorganic alkali bisulfites in combination with organotin sulfur-containing compounds and, thus, smaller amounts of alkali metal in the resin system are required to achieve comparable stabilization.

In the stabilizer compositions of organotin sulfur-containing compounds and alkali metal bisulfite addition products (or more simply "adducts" hereinafter) of this invention, the benefits of stabilization can be realized over broad ranges of both total parts by weight of the stabilizer compositions in the vinyl halide resin and the weight ratios of each of the components with respect to the other. Particularly useful stabilizer compositions of this invention are achieved with a total parts by weight range on the order of about 0.2 to about 15 parts by weight based upon 100 parts by weight (phr) of the vinyl halide resin. A most useful range of total parts by weight of stabilizer composition is on the order of about 0.5 to about 10 phr and this depends upon the desired heat stability in a particular vinyl halide resin composition consistent with other requirements and economies. There are certain generally preferred weight ratios of an organotin sulfur-containing compound relative to a particular alkali metal bisulfite adduct. This will become apparent in view of the detailed operating examples. However, it is to be emphasized that the most desirable weight ratios of each of the essential components of the composition of this invention for a particular application and resin system can be arrived at in accordance with the teachings of this invention. Thus, in its broader aspects, this invention is not limited to weight ratios of components. It has been found that synergistic stabilization levels of a particular carbonyl metal bisulfite and a particular organotin sulfur-containing compound will vary as exemplified hereinafter. In general, the combination of an alkali metal bisulfite adduct with the organotin sulfur-containing compound is utilized at total parts on the order of about 0.2 to about 15 phr; and approximate weight ratio of the alkali metal bisulfite adduct to the organotin component is in the range of about 1:10 to about 10:1, respectively.

ALKALI METAL BISULFITE ADDITION PRODUCTS

Aldehyde or ketone alkali metal bisulfites and their methods of preparation are known. Typically a saturated solution of sodium bisulfite forms crystalline addition products with aldehyde. Such an addition product is simply known as "aldehyde sodium bisulfite." The formation of bisulfite addition compounds is not only a general reaction of aldehydes, but most methyl ketones, low-molecular weight cyclic ketones, e.g., cyclohexanone, cyclooctanone, and certain other compounds having reactive carbonyl groups behave similarly. Herein the term "carbonyl alkali metal bisulfite" applies to such products generally. The addition of alkali metal bisulfite occurs in the mentioned products at the carbonyl group. However, it is also recognized that such addition can occur at another organic functional group such as a reactive double bond, epoxide group, or the like. Several reaction equations which illustrate the reaction taking place during the production of such adducts are as follows:

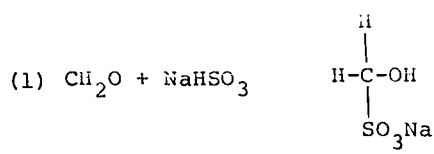

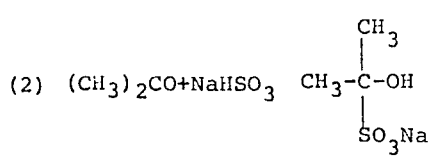

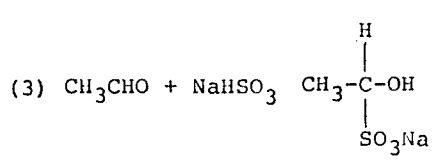

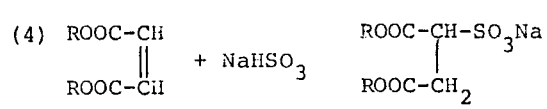

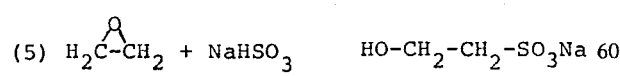

Addition products of the above type may be characterized by the formula:

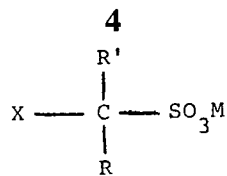

where M is an alkali metal and R or R' is an atom, radical or group selected from the class of hydrogen, hydrocarbyl or substituted hydrocarbyl including alkyl, carbocyclic, arylalkyl, aryl, hydroxyalkyl, ester, etc., and where X is hydrogen or hydroxyl.

For a discussion of the aldehyde or ketone bisulfite addition reaction, reference is made to Shriner, et al., "The Systematic Identification of Organic Compounds," 4th Ed., John Wiley & Sons, Pp. 149–150 (1956) and Brewster, "Organic Chemistry" 2nd Ed., Prentice-Hall, Pp. 158–159 (1955). Such information is incorporated herein by reference. Examples of such addition products include acetone sodium bisulfite, cyclohexanone sodium or potassium bisulfite, glyoxal sodium bisulfite, formaldehyde sodium bisulfite, benzaldehyde sodium bisulfite and acetaldehyde sodium bisulfite. However, in its broader aspects, the invention is not limited to such specific compounds in our resin stabilizers. Other equivalent alkali metal bisulfite addition products can be used as will become apparent in view of the operating examples and detailed description of this invention. The carbonyl alkali metal bisulfites have been found to provide synergistic results in combination with the organotin sulfur-containing compounds and are presently preferred. Further, the carbonyl sodium bisulfites are presently preferred over the carbonyl potassium bisulfites because of their more pronounced synergisms with the organotin component and greater efficiency in the vinyl halide resin compositions in comparison to, for example, inorganic sodium bisulfite.

ORGANOTIN SULFUR-CONTAINING COMPONENT

The organotin sulfur-containing compounds which are of use in this invention are generally characterized as having a sulfur-containing radical or atom attached to the tin through the sulfur atom and a hydrocarbon or substituted hydrocarbon group directly attached to the tin through a carbon atom, i.e., compounds containing the

group. These compounds can also be characterized by the formula R—Sn—S wherein R represents a mono or polyvalent hydrocarbon or non-hydrocarbon substituted hydrocarbon radical. As mentioned, this combination of R—Sn—S bonds has been heretofore recognized as giving optimum stabilization. The tin bonds are usually derived from polyvalent tin by having at least one valence for bonding to the sulfur atom while the remaining valence or valences are for bonding with a hydrocarbon radical. Tin usually acts as a bi- or tetravalent atom, but coordination complexes of tin are known where the tin behaves in even a higher valence state and, therefore, the valence state of tin can vary in the organotin compounds which can be used in this invention.

Generally, however, most organotins suitable for use in this invention are derived from tetravalent tin. Of the types of organotin compounds contemplated, included are organotin mercaptides which may be characterized by the Formula I:

$$R_xSn(SR')_{4-x}$$

wherein R and R' represent hydrocarbon or substituted hydrocarbon radicals selected from the group consisting of alkyl, aryl, oxyalkyl, oxyaryl and the furfuryl and tetrahydrofurfuryl radicals, and $x$ is an integral number from 1 to 3. Examples of such groups are alkyls such as methyl, ethyl, butyl, octyl, dodecyl and octadecyl; aryls such as phenyl, tolyl, naphthyl or xylyl; oxyalkyl and oxyaryl, such as propyloxide, butyloxide, octyloxide, benzyloxide; and the furfuryl and tetrahydrofurfuryl groups. Specific examples of organotin mercaptides in which R and R' are butyl, for example, and $x$ varies from 1 to 3 are monobutyltin tributylmercaptide, dibutyltin dibutylmercaptide and tributyltin monobutylmercaptide. Patents exemplifying this formula $R_xSn(SR')_{4-x}$ or a similar formula and a definition of compounds represented thereby include U.S. Pat. Nos. 2,641,588; 2,641,596; 2,648,650; 2,726,254 and 2,789,963, among others.

While the simplest representatives of the organotin sulfur-containing compounds are the organotin mercaptides of the Formula I, $R_xSn(SR')_{4-x}$, as stated herein above, the important components of the compounds are the organotin group and the tin-sulfur group. The organotins are therefore, not limited to the components of this formula, but are shown by all compounds in which a sulfur atom or mercapto radical is bound through the sulfur atom to the tin atom of the organotin radical, i.e., those organotins containing the R—Sn—S bonds. These compounds may be further defined by the Formula II:

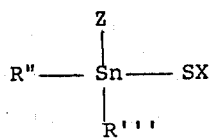

wherein R'', R''', SX and Z have the following significance: R'' and R''' may be different monovalent hydrocarbon radicals or substituted hydrocarbon radicals, but will be generally the same radicals because the starting materials for the preparation of the organotin mercapto compounds will be generally the di-(or tri-) hydrocarbon tin halides or oxides available in commerce. The nature of these groups has in most cases no, or only a very minor, influence on the properties of the end products. R'' and R''' may be aliphatic, aromatic, or alicyclic groups such as methyl, ethyl, propyl, butyl, amyl, hexyl, octyl, lauryl, allyl, benzyl, phenyl, tolyl, naphtyl and cyclohexyl, or substituted hydrocarbon groups of these groups having —OH, —NH$_2$, —CN, etc., radicals in the molecule such as cyanoethyl (of the type described in U.S. Pat. No. 3,471,538) and the like.

The group SX of Formula II, for instance, may be sulfur alone, the rest of a mercaptan, or a mercapto alcohol, or of an ester of a mercapto alcohol or mercapto acid. The patents mentioned above in the background of the invention give examples of this. Aliphatic and aromatic mercaptans may be employed to form the group SX. In the case of aliphatic mercaptans, those having 8 to 18 carbon atoms, e.g., decyl or dodecyl mercaptan are usually preferred because the lower mercaptans are unsuitable for the preparation and use of the stabilizers on account of their offensive smell. Suitable aromatic mercaptans are, for instance, thionaphthol, thiobenzyl alcohol, phenoxyethyl mercaptan, phenoxyethoxyethyl mercaptan, and others. As examples of suitable mercapto alcohols, monothioethylene glycol, monothiopropylene glycol, thioglycerol, thiodiethylene glycol, and others may be mentioned. Particularly suitable are the esters of these mercapto alcohols in which the hydroxy groups are esterified by an aliphatic, aromatic, or alicyclic saturated or unsaturated monocarboxylic acid. Readily available mercaptoacid esters are the esters of thioglycolic acid, such as ethyl thioglycolate, isooctylthioglycolate, and generally the esters of mono and dibasic aliphatic and aromatic mercapto acids, such as esters of beta thiopropionic acid, thiolactic acid, thiobutyric acid and mercapto lauric acid. It will be understood that the recited examples for group SX apply to SR' of Formula I and the examples of R'' or R''' apply to R or R' of Formula I.

The group Z of Formula II may be a monovalent hydrocarbon radical like R'' and R''', in which case the compound is a tri-hydrocarbon tin mercapto compound. The three hydrocarbon groups may have the same or different composition. Z may also be a sulfur alone or the rest of a mercapto compound linked through the S atom to the tin atom, in which case it may have the same composition as SX or a different composition. The former case represents a dihydrocarbon tin dimercapto compound and the latter case represents a mixed mercapto derivative of the dihydrocarbon stannanediol. In another sub-group, Z may be the rest of an alcohol or of a carboxylic acid linked through the oxygen of the alcoholic hydroxyl group or of the carboxylic acid group to the tin atom. Such compounds can be defined as monoesters or monoethers of hydrocarbon substituted stannanediol, in which the second hydroxyl group of the stannanediol is replaced by a mercapto compound. Thio alcohols and acids which are capable of forming such ether and ester groups are illustrated in the patents cited in the background of this invention along with their methods of preparation. Other specific references to organotin sulfur-containing compounds as widely described in the patent art include U.S. Pat. No. 2,641,588, col. 1, lines 32–53 to col. 2, lines 13–46; U.S. Pat. No. 2,641,596, col. 1, lines 10–44; U.S. Pat. No. 2,726,254, col. 1, line 63 to col. 2, line 19; U.S. Pat. No. 2,789,963, col. 2, lines 35–60; U.S. Pat. No. 2,914,506, col. 1, lines 59 to col. 4, line 8; U.S. Pat. No. 2,870,119, col. 1, lines 27–53 and U.S. Pat. No. 3,126,400, col. 1, lines 21–61. Other patents exemplifying these organotin sulfur-containing compounds include U.S. Pat. Nos. 3,069,447; 3,478,071; 2,998,441; 2,809,956; 3,293,273; 3,396,185; 3,485,794; 2,830,067 and 2,855,417.

Other organotin sulfur-containing compounds which are within the scope of this invention are characterized by the following Formula III:

$$RSnS_{1.5})_n$$

wherein R is defined as above, S is sulfur and n is an integral number from about 2 to about 1,000. These polymeric compounds are described in the patent literature, for example, at U.S. Pat. No. 3,021,302 at col.

1, line 60 to col. 2, line 17; U.S. Pat. No. 3,424,712 at col. 3, line 34 to col. 4, line 2; U.S. Pat. No. 3,424,717 at col. 3, line 13 to col. 4, line 21. Specific reference is made to these patents at the referenced columns for more details. Other polymeric tin mercaptide type compounds having the R—Sn—S bonds characterizing the organotin sulfur-containing compounds suitable for use in this invention are exemplified in U.S. Pat. Nos. 2,809,956; 3,293,273; 3,396,185 and 3,485,794, and these exemplifications are incorporated herein by reference. Specific examples of organotin sulfur-containing compounds include dibutyltin bis (isooctylthioglycolate), dimethyltin (isooctylthioglycolate), dioctyltin (isooctylthioglycolate), monomethyltin tris (isooctylthioglycolate), monobutyltin tris (isooctylthioglycolate), dibutyltin dilaurylmercaptide, butyl thiostannoic acid and dibutyltin bis (isooctyl-beta-mercaptopropionate).

Of course, it is obvious that organotin mercaptides, organotin mercapto acids, organotin mercaptoacid esters, etc., per se form no part of this invention and the mentioned patents and their specific disclosures clearly teach these compounds and their method of production to enable anyone of ordinary skill to use them in carrying out this invention. Other literature references which are incorporated herein and which pertain to the organotin sulfur-containing component having the R—Sn—S group to exemplify the scope intended for this component in accord with the principles of this invention, include "The Development of The Organotin Stabilizers," by H. Verity Smith, Tin Research Institute, Greenford, Middlesex, Pp. 15–22, (December, 1959).

The principles of this invention and its operating parameters will be further understood with reference to the following detailed examples which serve to illustrate the types of specific materials and their amounts as used in typical vinyl halide resin formulations and the synergisms displayed by the essential combination of components in the stabilizer composition according to this invention. These examples are considered to be exemplary of this invention, and should not be considered as limiting, especially in view of applicants' broad disclosure of principles of this invention.

In the examples which follow, a standard resin formula was employed which contained 100 parts by weight of polyvinyl chloride homopolymer which is characterized as a white powder having a particle size such that 100 percent passes through a 42 mesh screen at a specific gravity of 1.40 (Geon 103 EP by B. F. Goodrich). Included in the standard resin formula is also 6 parts by weight of a processing aid which is an acrylic polymer in powdered form which improves the hot processing of rigid and plasticized vinyl compounds. (Acryloid K120N by Rohm and Haas Company). This material is a fine, white free flowing powder having a bulk density at about 0.30 grams per cc and a viscosity, 10 percent in toluene, at 600 cps (Brookfield). The processing aid merely facilitates hot processing and forms no part of this invention. A paraffin wax lubricant, i.e., a commercial wax designated 165 (H. M. Royal, Inc.) was also employed at 2 parts by weight in the resin formula. The term "standard resin blank" or just "blank" is used hereinafter to designate the standard resin formula without heat stabilizer additives. Various combinations of the organotin sulfur-containing compounds and carbonyl alkali metal bisulfites were mixed into the standard resin formula according to the following examples on a parts by weight basis. All amounts of such stabilizer components, in the tables and examples unless otherwise indicated, are on a parts per hundred resin basis, or as indicated above, simply "phr". The blank resin formula with and without stabilizer additives are tested in the following examples by first milling the mixtures to form a uniform polyvinylchloride composition for 5 minutes at 350°F., after which time long term heat stabilities of test samples were determined by oven treatment at either of two temperatures, 375°F. or 400°F. as indicated. The heat stability contribution of the stabilizer compositions (or components thereof) hereinafter are determined by ascertaining the number of minutes at the test temperature required for the samples to turn very dark or black. Thus, the term "heat stability contribution" is used to indicate the amount of heat stability in minutes contributed by a composition or component to the resin blank formula.

EXAMPLES 1–11

Examples 1–11 demonstrated the synergistic combination of an organotin sulfur-containing compound and a ketone addition product of sodium bisulfite. For this purpose, acetone sodium bisulfite was tested alone, and at various levels in the range of 0.25–1.75 phr with dibutyltin bis (isooctylthioglycolate), i.e., "DBT" at various levels in the range of about 1.75–0.25 phr. Also, DBT was tested alone at 0.5, 1.0 and 2 phr. The standard resin formula was prepared as above except that 1 part by weight of wax was substituted for 2 parts of wax. Milling of all samples in the series took place for 5 minutes at 350°F., after which 400°F. oven heat stability tests were performed. The contributions of the acetone sodium bisulfite alone, DBT alone and various combinations of the two components to the heat stability of the standard resin blank are reported in Table I.

TABLE I

| Example | Components | 400° F Heat Stability Contribution |
|---|---|---|
| 1 | 2.0 acetone sodium bisulfite | 0–5' |
| 2 | 1.75 acetone sodium bisulfite 0.25 DBT | 25' |
| 3 | 1.5 acetone sodium bisulfite 0.5 DBT | 30' |
| 4 | 1.25 acetone sodium bisulfite 0.75 DBT | 30–35' |
| 5 | 1.0 acetone sodium bisulfite 1.0 DBT | 30–35' |
| 6 | 0.75 acetone sodium bisulfite 1.25 DBT | 30–35' |
| 7 | 0.5 acetone sodium bisulfite 1.5 DBT | 30–35' |
| 8 | 0.25 acetone sodium bisulfite 1.75 DBT | 30–35' |
| 9 | 2.0 DBT | 30–35' |
| 10 | 1.0 DBT | 20' |
| 11 | 0.5 DBT | 15' |

Referring to Table I, the ketone addition product of sodium bisulfite contributed synergistically with an organotin sulfur-containing compound as a stabilizer for vinyl halide resins. Example 1 demonstrated that acetone sodium bisulfite alone made no material contribution to the standard resin blank. On the other hand, the DBT alone at 2.0, 1.0 and 0.5 phr respectively, contributed 30–35 minutes, 20 minutes and 15 minutes of heat stability to the resin blank under conditions of tests. (See Examples 9–11). However, combinations of acetone sodium bisulfite at levels of 0.25–1.75 phr, with the organotin compound at levels of 1.75–0.25 phr, synergistically enhanced heat stability. Even though the levels of the organotin were reduced from 2 phr to 0.25 phr, with increasing amounts of the otherwise ineffective acetone sodium bisulfite from 0.25 to 1.75 phr, long term heat stability was maintained. Furthermore, comparison of Examples 9–11 with Examples 1, 3 and 5 demonstrates the unexpected contribution of the combination.

EXAMPLES 12–18

In a manner similar to Examples 1–11, other carbonyl sodium bisulfites were employed in combination with the organotin sulfur-containing compound for the purpose of demonstrating their synergistic behaviors. The standard resin formula was prepared as above except 1 phr calcium stearate was substituted for the wax. Heat stability tests were performed for the organotin sulfur-containing compound (DBT) in combination with sodium bisulfite, cyclohexanone sodium bisulfite, glyoxal disodium bisulfite, acetaldehyde sodium bisulfite, acetone sodium bisulfite and formaldehyde sodium bisulfite. The results are reported in Table II.

TABLE II

| | Components | | 400°F Heat Stability Contribution |
|---|---|---|---|
| Example 12 | 1.0 | DBT | 30' |
| Example 13 | 1.0 | DBT | |
| | 1.5 | sodium bisulfite | 40' |
| Example 14 | 1.0 | DBT | |
| | 1.5 | cyclohexanone sodium bisulfite | 50' |
| Example 15 | 1.0 | DBT | |
| | 1.5 | glyoxal di-sodium bisulfite | 40' |
| Example 16 | 1.0 | DBT | |
| | 1.5 | acetaldehyde sodium bisulfite | 50–60' |
| Example 17 | 1.0 | DBT | |
| | 1.5 | acetone sodium bisulfite | 50–60' |
| Example 18 | 1.0 | DBT | |
| | 1.5 | formaldehyde sodium bisulfite | 50' |

Table II demonstrates that various carbonyl sodium bisulfites behave as acetone sodium bisulfite with an organotin sulfur-containing compound. The ketone and aldehyde sodium bisulfites of Examples 14–18 demonstrated a synergistic behavior with the organotin component at least as good or better than sodium bisulfite. Synergism with the glyoxal di-sodium bisulfite and the organotin compound was observed in Example 15, comparable to sodium bisulfite of Example 13. However, the synergisms of the other carbonyl sodium bisulfites were 10–20 minutes greater than Example 13.

The compositions of the Examples 12–18 were tested for clarity by pressing out such compositions for about 5 minutes at 350°F. In comparison to the pressed formula of Example 13 containing sodium bisulfite which exhibited particulate opacity, improved clarity was observed with the ketone or aldehyde sodium bisulfites of Examples 14–18. Accordingly, when long term heat stability is desired with clarity, the ketone and aldehyde sodium bisulfites are very advantageously employed according to the principles of this invention.

EXAMPLES 19–25

The formulation and heat stability procedures of Examples 12–18 were performed again except that the amounts of the sodium bisulfite and all carbonyl sodium bisulfites were adjusted to provide the same sodium metal content in each Example 19–25. Then, the long term heat stabilities of the resultant vinyl halide resin compositions were observed and the results are reported in Table III.

TABLE III

| | Components | | 400°F Heat Stability Contribution |
|---|---|---|---|
| Example 19 | 1.0 | DBT | 35' |
| Example 20 | 1.0 | DBT | |
| | 1.0 | sodium bisulfite | 40' |
| Example 21 | 1.0 | DBT | |
| | 2.1 | cyclohexanone sodium bisulfite | >50' |
| Example 22 | 1.0 | DBT | |
| | 1.15 | glyoxal di-sodium bisulfite | 40' |
| Example 23 | 1.0 | DBT | |
| | 1.5 | acetaldehyde sodium bisulfite | >50' |
| Example 24 | 1.0 | DBT | |
| | 1.65 | acetone sodium bisulfite | >50' |
| Example 25 | 1.0 | DBT | |
| | 1.35 | formaldehyde sodium bisulfite | >50' |

Examples 20–26 of Table III demonstrated that the sodium metal in the carbonyl sodium bisulfite is generally more efficient in heat stabilization than the sodium metal in the inorganic sodium bisulfite. With the exception of glyoxal di-sodium bisulfite (Example 22) because of its incomplete compatability in the PVC resin composition as demonstrated by plate-out on the mill rolls, the carbonyl sodium bisulfites of Example 21, 23–25 out-performed the sodium bisulfites at the same levels of sodium metal. The sodium bisulfite of Example 19 exhibited earlier discoloration and finally degradation at about 40 minutes whereas Examples 21, 23–25 did not significantly discolor even after 50 minutes. These examples also demonstrated that variations in the metal content of the carbonyl sodium bisulfites can be made in accordance with the principles of this invention and the advantageous results maintained.

EXAMPLES 27–35

Examples 27–35 further illustrate the practice of this invention. The standard resin formula was used in these examples with various carbonyl alkali metal bisulfites in phr alone and in combination with an organotin sulfur-containing compound (DBT). Heat stability contributions were determined by milling at 350°F and oven testing at 375°F. The results are reported in Table IV.

Examples 27–35 confirmed the heat stabilizing effectiveness of the carbonyl alkali metal bisulfites in combination with the organotin component at 375°F heat stability testing. Also, the carbonyl sodium bisulfite of Example 31 far out-performed the potassium counterpart of Example 30. Even though synergism was demonstrated by the potassium derivative of Example 30, the sodium derivative exceeded that contribution by 40 minutes. These examples demonstrate that the carbonyl sodium bisulfites are presently preferred over the potassium counterparts. Furthermore, Examples 27–35, as well as the above examples, demonstrated that the carbonyl group of the alkali bisulfite addition

TABLE IV

| | Components | 375° F Heat Stability Contribution |
|---|---|---|
| Example 27 | 0.5 DBT | 20' |
| Example 28 | 1.0 cyclohexanone potassium bisulfite | 0' |
| Example 29 | 1.0 cyclohexanone sodium bisulfite | 0' |
| Example 30 | 0.5 DBT 1.0 cyclohexanone potassium bisulfite | 40' |
| Example 31 | 0.5 DBT 1.0 cyclohexanone sodium bisulfite | 80' |
| Example 32 | 0.5 DBT 1.0 glyoxal di-sodium bisulfite | 50' |
| Example 33 | 0.5 DBT 1.0 acetaldehyde sodium bisulfite | 70' |
| Example 34 | 0.5 DBT 1.0 formaldehyde sodium bisulfite | 60' |
| Example 35 | 0.5 DBT 1.0 benzaldehyde sodium bisulfite | 50' | products may vary and the desired results of this invention can still be achieved. For instance, lower alkyl ketones, low-molecular weight carbocylic ketones, aldehydes in general of the hydrocarbyl or substituted hydrocarbyl type, arylalkyl aldehydes or ketones, etc., are among the class of reactive carbonyl-containing compounds which form addition products with the alkali bisulfites, particularly sodium bisulfites. The reaction of such carbonyl compounds has been widely developed to identify the presence of organic carbonyl-containing compounds as described above in the literature references. Furthermore, as discussed above, other organic compounds form addition products with alkali metal bisulfites. Accordingly, in its broadest aspects, this invention is predicated upon the use of reaction products or adducts of an alkali metal bisulfite and an organic compound, especially carbonyl-containing compounds, in combination with an organotin sulfur-containing compound to either provide enhanced heat stabilization of resins, to achieve improved clarity in molded resin products in comparison to inorganic alkali metal bisulfites or to obtain a greater stabilization efficiency than such inorganic metal bisulfites.

In each of the above examples, the vinyl halide resin which was employed is a homopolymer of vinyl chloride, i.e., polyvinyl chloride. It is to be understood, however, that this invention is not limited to a particular vinyl halide resin such as polyvinyl chloride, of course. Other halogen-containing resins which are employed and illustrate the principles of this invention include chlorinated polyethylene, chlorinated polyvinyl chloride and the vinyl halide resin type. Vinyl halide resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, styrene, etc. A simple case is the conversion of vinyl chloride $H_2C:CHCl$ to polyvinyl chloride $(CH_2-CHCl-)_n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers, chlorinated polyvinyl chloride; and the like. Of course, the vinyl halide commonly used in the industry is the chloride, although others such as bromide and fluoride may be used.

It is also to be understood that other components such as lubricants, processing aids, pigments, other stabilizers, other non-halogenated resins, etc., can be incorporated in the resin compositions and the benefits of this invention can be achieved. Accordingly, other modifications will become apparent in view of the teachings herein without departing from the true spirit and scope of this invention.

What is claimed is:

1. A resin stabilizer composition which consists essentially of, an organotin sulfur-containing compound having a

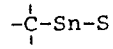

group, and an alkali metal bisulfite addition product characterized by the formula

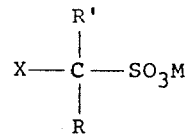

where M is an alkali metal and R or R' is selected from the class consisting of hydrogen, hydrocarbyl and substituted hydrocarbyl and X is selected from the class consisting of hydrogen and hydroxyl, said organotin and addition product components in relative amounts which together provide a synergistic stabilizing effectiveness upon said resin.

2. A resin stabilizer composition which consists essentially of, an organotin sulfur-containing compound having a

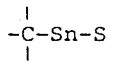

group, and a carbonyl derivative selected from the group consisting of an aldehyde or ketone alkali metal bisulfite, said organotin and carbonyl derivative components in relative amounts which together provide a synergistic stabilizing effectiveness upon said resin.

3. The composition of claim 2 wherein said organotin sulfur-containing compound is selected from the group consisting of an organotin mercaptide, organotin mercaptoacid, organotin mercaptoacid ester, organotin sulfide, and organo thiostannoic acid, and mixtures thereof.

4. The composition of claim 2 wherein said carbonyl derivative is selected from the group consisting of acetone sodium bisulfite, cyclohexanone sodium bisulfite, cyclohexanone potassium bisulfite, glyoxal di-sodium bisulfite, acetaldehyde sodium bisulfite, aldehyde sodium bisulfite or benzaldehyde sodium bisulfite, and mixtures thereof.

5. The composition of claim 2 wherein said alkali metal is sodium.

6. The composition of claim 2 wherein the relative amount of the organotin compound to the carbonyl compound is on the order of about 1:10 to 10:1.

7. A vinyl halide resin composition which comprises a vinyl halide resin and, as a heat stabilizer, an effective amount of a composition consisting essentially of, an organotin sulfur-containing compound having a

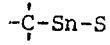

group, and an alkali metal bisulfite addition product characterized by the formula

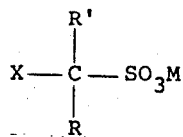

where M is an alkali metal and R or R' is selected from the class consisting of hydrogen, hydrocarbyl and substituted hydrocarbyl and X is selected from the class consisting of hydrogen and hydroxyl, said organotin and addition product components in relative amounts which together provide a synergistic stabilizing effectiveness upon said resin.

8. A vinyl halide resin composition which comprises a vinyl halide resin and, as a heat stabilizer, an effective amount of a composition consisting essentially of, an organotin sulfur-containing compound having a

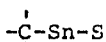

group and, a carbonyl derivative selected from the group consisting of an aldehyde or ketone alkali metal bisulfite, said organotin and carbonyl derivative components in relative amounts which together provide a synergistic stabilizing effectiveness upon said resin.

9. The composition of claim 8 wherein said organotin sulfur-containing compound is selected from the group consisting of an organotin mercaptide, organotin mercaptoacid, organotin mercaptoacid ester, organotin sulfide, and organo thiostannoic acid, and mixtures thereof.

10. The composition of claim 8 wherein said carbonyl derivative is selected from the group consisting of acetone sodium bisulfite, cyclohexanone sodium bisulfite, cyclohexanone potassium bisulfite, glyoxal disodium bisulfite, acetaldehyde sodium bisulfite, formaldehyde sodium bisulfite or benzaldehyde sodium bisulfite, and mixtures thereof.

11. The composition of claim 8 wherein said alkali metal is sodium.

12. The composition of claim 8 wherein said effective amount is in the range of about 0.2 to about 15 parts per 100 parts resin.

13. The composition of claim 12 wherein the relative amounts of components are in the weight ratio range of about 1:10 to about 10:1.

14. An article formed from the composition of claim 8 having clarity.

15. The composition of claim 10 wherein the organotin sulfur-containing compound is selected from the group consisting of dibutyltin bis (isooctylthioglycolate), dimethyltin (isooctylthioglycolate), dioctyltin (isooctylthioglycolate), monomethyltin tris (isooctylthioglycolate), monobutyltin tris (isooctylthioglycolate), dibutyltin dilaurylmercaptide, butyl thiostannoic acid and dibutyltin bis (isooctyl-beta-mercaptopropionate).

16. The composition of claim 15 wherein said effective amount is in the range of about 0.2 to about 15 parts per 100 parts resin and the relative amount of the organotin compound to the carbonyl derivative is on the order of about 1:10 to 10:1.

* * * * *

UNITED STATES PATENT OFFICE
CERTIFICATE OF CORRECTION

PATENT NO. : 3,865,787
DATED : February 11, 1975
INVENTOR(S) : Jerome H. Ludwig and Dale J. Dieckmann It is certified that error appears in the above-identified patent and that said Letters Patent are hereby corrected as shown below:

Col. 2  Line 20  "alkail"    should be --alkali--

Col. 7  Line 46  "100"       should be --200--

Signed and sealed this 6th day of May 1975.

(SEAL)
Attest:

RUTH C. MASON
Attesting Officer

C. MARSHALL DANN
Commissioner of Patents
and Trademarks